US011164078B2

(12) United States Patent
Jin et al.

(10) Patent No.: US 11,164,078 B2
(45) Date of Patent: Nov. 2, 2021

(54) MODEL MATCHING AND LEARNING RATE SELECTION FOR FINE TUNING

(71) Applicant: INTERNATIONAL BUSINESS MACHINES CORPORATION, Armonk, NY (US)

(72) Inventors: Ke Jin, Beijing (CN); Yubo Li, Beijing (CN); Yonghua Lin, Beijing (CN); Junsong Wang, Beijing (CN); Qing Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1030 days.

(21) Appl. No.: 15/806,595

(22) Filed: Nov. 8, 2017

(65) Prior Publication Data

US 2019/0138895 A1    May 9, 2019

(51) Int. Cl.
*G06N 3/08* (2006.01)
*G06N 3/04* (2006.01)

(52) U.S. Cl.
CPC .............. *G06N 3/08* (2013.01); *G06N 3/04* (2013.01)

(58) Field of Classification Search
CPC .. G06N 5/00; G06N 7/00; G06N 3/00; G06N 20/00; G06N 3/04; G06N 3/0454; G06N 3/0481; G06N 3/08
USPC ........................................................ 706/25
See application file for complete search history.

(56) References Cited

U.S. PATENT DOCUMENTS

| 6,452,870 B1 * | 9/2002 | Breed | G01S 15/04 367/96 |
| 10,192,001 B2 * | 1/2019 | Leeman-Munk | G06N 3/04 |
| 2006/0242147 A1 * | 10/2006 | Gehrking | G06F 16/951 |
| 2014/0229476 A1 * | 8/2014 | Fouad | G06F 16/3347 707/729 |
| 2015/0294246 A1 * | 10/2015 | Guven Kaya | G06Q 10/06393 705/7.28 |

(Continued)

FOREIGN PATENT DOCUMENTS

| EP | 3101599 A2 * | 12/2016 | ............. G06N 20/00 |
| KR | 20150036176 A * | 4/2015 | ......... G06F 12/0246 |

(Continued)

OTHER PUBLICATIONS

Mengchen, L. (May 4, 2016). Towards better analysis of deep Convolutional neural networks. arXiv.org. https://arxiv.org/abs/1604.07043 (Year: 2016).*

(Continued)

*Primary Examiner* — Li Wu Chang (74) *Attorney, Agent, or Firm* — L. Jeffrey Kelly (57) ABSTRACT

A method, computer system, and computer program product for model selection for training a new dataset is provided. The present invention may include choosing a model from a set of models to be evaluated for training the new dataset, selecting a sample input from a subset of the new dataset, calculating a model activation score for each of the sample inputs in the chosen model, calculating an accumulated model activation score for the chosen model, depending on the model activation score of each of the sample inputs in the chosen model, calculating an accumulated model activation score for each model from the set of models to be evaluated for training the new dataset, and selecting the model for training the new dataset with the highest accumulated model activation score.

15 Claims, 6 Drawing Sheets

(56) References Cited

U.S. PATENT DOCUMENTS

| | | | |
|---|---|---|---|
| 2016/0217369 A1 | 7/2016 | Annapureddy et al. |
| 2016/0350336 A1 | 12/2016 | Checka et al. |
| 2017/0032244 A1 | 2/2017 | Kurata |

FOREIGN PATENT DOCUMENTS

| | | |
|---|---|---|
| WO | 2016069581 A1 | 6/2016 |
| WO | 2016182659 A1 | 11/2016 |

OTHER PUBLICATIONS

Kaastra, I. (Feb. 12, 1999). Designing a neural network for forecasting financial and economic time series. ScienceDirect.com | Science, health and medical journals, full text articles and books. https://www.sciencedirect.com/science/article/pii/0925231295000399 (Year: 1999).*

Raschka, S. (Jun. 11, 2016). Model evaluation, model selection, and algorithm selection in machine learning. Dr. Sebastian Raschka. https://sebastianraschka.com/blog/2016/model-evaluation-selection-part1.html (Year: 2016).*

Mengchen, L. (May 4, 2016). Towards better analysis of deep Convolutional neural networks. arXiv.org. https://arxiv.org/abs/1604.07043 (Year: 2016) (Year: 2016).*

Kaastra, I. (Feb. 12, 1999). Designing a neural network for forecasting financial and economic time series. ScienceDirect.com | Science, health and medical journals, full text articles and books. https://www.sciencedirect.com/science/article/pii/0925231295000399 (Year: 1999) (Year: 1999).*

Raschka, S. (Jun. 11, 2016). Model evaluation, model selection, and algorithm selection in machine learning. Dr. Sebastian Raschka. https://sebastianraschka.com/blog/2016/model-evaluation-selection-part1.html (Year: 2016) (Year: 2016).*

Shankar, S. (Apr. 22, 2016). Refining architectures of deep Convolutional neural networks. arXiv.org. https://arxiv.org/abs/1604.06832 (Year: 2016).*

Bhavsar, P. (Aug. 4, 2017). Howto train your neural network. LinkedIn. https://www.linkedin.com/pulse/how-train-your-neural-network-pratik-bhavsar (Year: 2017).*

Chandra et al. "Deep learning with adaptive learning rate using laplacian score", Expert Systems With Applications, 2016, pp. 1-7.*

Mell et al., "The NIST Definition of Cloud Computing," National Institute of Standards and Technology, Sep. 2011, p. 1-3, Special Publication 800-145.

Ng et al., "Deep Learning for Emotion Recognition on Small Datasets Using Transfer Learning", http://dx.doi.org/10.1145/2818346.2830593, ICMI '15 Proceedings of the 2015 ACM on International Conference on Multimodal Interaction, pp. 443-449, Seattle, Washington, USA, Nov. 9-13, 2015.

Yu et al., "A Comprehensive guide to Fine-tuning Deep Learning Models in Keras (Part I)", https://flyyufelix.github.io/2016/10/03/fine-tuning-in-keras-part1.html, Oct. 3, 2016, pp. 1-6.

Stanford, "Multi-Layer Neural Network", Unsupervised Feature Learning and Deep Learning Tutorial, http://ufldl.stanford.edu/tutorial/supervised/MultiLayerNeuralNetworks/, accessed on Nov. 3, 2017, pp. 1-9.

Github, "CS231n Convolutional Neural Networks for Visual Recognition", accessed on Nov. 3, 2017, pp. 1-14.

Donahue et al., "DeCAF: A Deep Convolutional Activation Feature for Generic Visual Recognition", arXiv:1310.1531v1 [cs.CV] Oct. 6, 2013, 10 pages.

* cited by examiner

MODEL MATCHING AND LEARNING RATE SELECTION FOR FINE TUNING

BACKGROUND

The present invention relates, generally, to the field of computing, and more particularly to machine learning.

Machine learning allows a computer the ability to learn without being explicitly programmed. The computer can learn to make predications based on a training dataset and construct a model. The model is built of algorithms which are improved by comparing a model output result to a target result. Training may continue until the target result is achieved within certain parameters, for example an error rate below a predetermined level. Trained models may be used for new datasets. New data can be applied to models previously created to make new predictions. Significant computation may be expended to select a learning model and a learning rate. Choosing a machine learning model, which may be referred to as model matching, and choosing a learning rate, may depend on the new data, time constraints, a desired learning rate, a new data size and type of data. Learning rate is a constant used which affects the speed of learning. A low learning rate results in more calculations and increased time until convergence, or learning is complete. A high learning rate results in bigger changes in algorithms leading to overfitting the dataset and may make final determination of the algorithm difficult.

SUMMARY

According to an embodiment, a method, computer system, and computer program product for model selection for training a new dataset is provided. The present invention may include choosing a model from a set of models to be evaluated for training the new dataset, selecting a sample input from a subset of the new dataset, calculating a model activation score for each of the sample inputs in the chosen model, calculating an accumulated model activation score for the chosen model, depending on the model activation score of each of the sample inputs in the chosen model, calculating an accumulated model activation score for each model from the set of models to be evaluated for training the new dataset, and selecting the model for training the new dataset with the highest accumulated model activation score.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to machine learning. The following described exemplary embodiments provide a system, method, and program product to, among other things, select an existing trained model for initializing new data, and to select a learning rate. Therefore, the present embodiment has the capacity to improve the technical field of machine learning by calculating an accumulated model activation score for the new data on each existing trained model to choose a best existing trained model to use. Additionally, an accumulated layer activation score may be calculated for each existing trained model for the new data, in order to choose a learning rate. Calculation of the accumulated model activation score and the accumulated layer activation score may each require limited computation compared to training each existing trained model with the new data. This may greatly reduce computation time and calculations and vastly improve selection of an existing trained model to use in training new data.

Machine learning allows a computer system an ability to learn without being programmed by building a model based on data input. The model is formed by training using the data input and learning, and by calculation of parameters of an algorithm. The model is a product of machine learning and using the algorithm can make predictions and solve problems based on inputs.

Deep learning is a sub-category of machine learning and uses neural networks and may be referred to as a deep neural network. A neural network contains layers or levels. Each layer contains a feature map, where an output of the feature map of a layer is an input to a sequential layer of the neural network. Each layer has a number or a counter of activations which corresponds to a number of neurons in that layer.

As previously described, new data can be applied to existing machine learning models to make a new prediction. Choosing a machine learning model, which may be referred to as model matching, and choosing a learning rate, may depend on the new data, time constraints, a desired learning rate, a new data size and type of data. Significant computation and time may be expended trying out new data on existing models in order to choose a best match model. Alternatively, minimal computation may be used to calculate an accumulated model activation score for different models, in order to select a model to use to train with the new data.

Existing models, or models, have been trained on existing data. For example, a model may be able to classify different types of cars, and was trained on car data. Another model may be able to identify dogs, or trees, having been trained on dog data, or tree data, respectively. Additional models may be road maps, airline routes, medical terms, faces, etc. The model may be considered an algorithm, where once the model is trained, an input results in an output, based on an algorithm. The algorithm has been determined by the computer system as a result of training the data set on the model. For instance, after training, the car model may be able to take a photograph of a car as input and output the make, model, and year of the car in the photograph. Training is the learning or calculating of the parameters which define the model, based on the dataset or samples.

When new data is available, and a new model is desired from the new data, it is advantageous to start the creation of the new model using an existing trained model. Fine-tuning technology provides the capability of utilizing other existing models, which makes it possible to train large scale networks on small datasets. Using an existing trained model will significantly reduce the amount of data calculations and time to create a new model. All prior data may be removed from the existing trained model, and the new data input into the existing trained model. The existing trained model may then be trained with the new data, in order to have a resulting new trained model. The parameters of the existing model will then be further adjusted and the new trained model will then have new parameters which enable it to have an input and a resulting output based on the new data. For example, the car model may be used, and may be trained with bicycle data. The resulting new model may be able to identify a make, model and year of a bicycle from a photograph of the bicycle. This may be referred to as transfer learning, or fine tuning, which is using knowledge learned from one situation and applying the knowledge to a different situation.

A learning rate must be set for training the new data on the existing trained model. A learning rate is a constant used which affects a speed of learning. A low learning rate results in more calculations and increased time until learning is complete. A high learning rate results in bigger changes in algorithms and may make final determination of the algorithm difficult. Selection of a learning rate may help to find a good balance of a low enough learning rate to learn the new data on the model selected while having a high enough learning rate to facilitate creation of the new model.

Selection of a model for training with new data and selection of a learning rate to train the new data on the model is difficult and affects computer usage and time for creation of a new model based on the new data. As such, it may be advantageous to, among other things, implement a system that chooses a model for training and selects the learning rate.

According to an embodiment, existing models may be compared by calculating an accumulated model activation score, (hereinafter "AMAS"), for each model with new data, which indicates an activation intensity of the existing model with the new data. A comparison of the AMAS for each model can be used to determine the optimum model to select. Additionally, an accumulated layer activation score, (hereinafter "ALAS"), can be calculated which indicates an activation intensity of each layer of the existing model, and can be used to determine a learning rate for training the new data on the chosen model.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to select an existing trained model for initializing new data to create a new trained model, and to select a learning rate.

Figure 1:
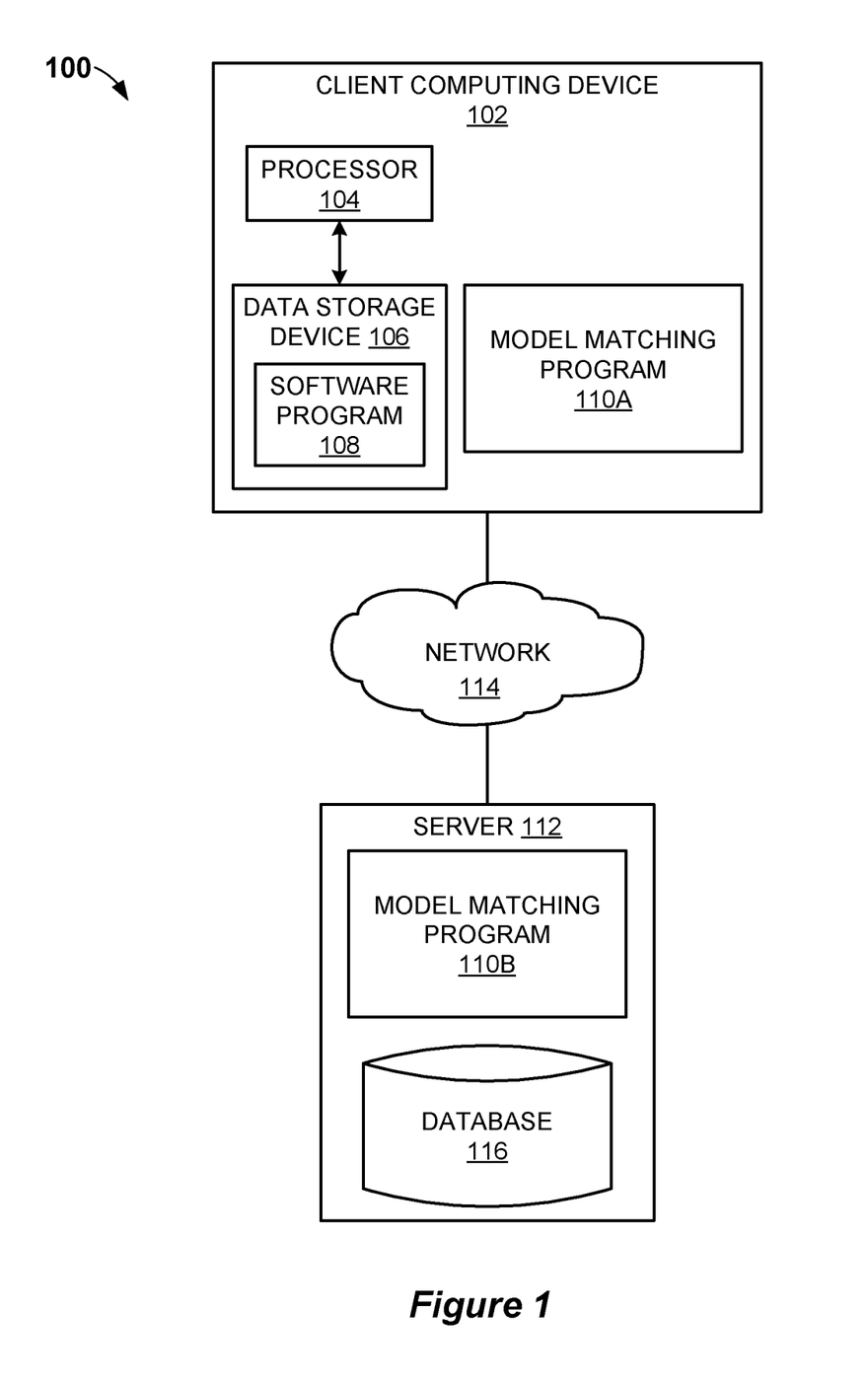
FIG. 1 illustrates an exemplary networked computer environment according to an embodiment.

Referring to FIG. 1, an exemplary networked computer environment 100 is depicted, according to an embodiment. The networked computer environment 100 may include client computing device 102 and a server 112 interconnected via a communication network 114. According to an implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of an implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a model matching program 110A and communicate with the server 112 via the communication network 114, in accordance with an embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components and external components.

The server computer 112 may be a laptop computer, netbook computer, personal computer (PC), a desktop computer, or any programmable electronic device or any network of programmable electronic devices capable of hosting and running a model matching program 110B and a database 116 and communicating with the client computing device 102 via the communication network 114, in accordance with embodiments of the invention. As will be discussed with reference to FIG. 4, the server computer 112 may include internal components and external components. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the model matching program 110A, 110B may be a program capable of determining a best model from existing trained models to train new data. The model matching and learning rate selection for fine tuning method is explained in further detail below with respect to FIGS. 2-3.

Figure 2:
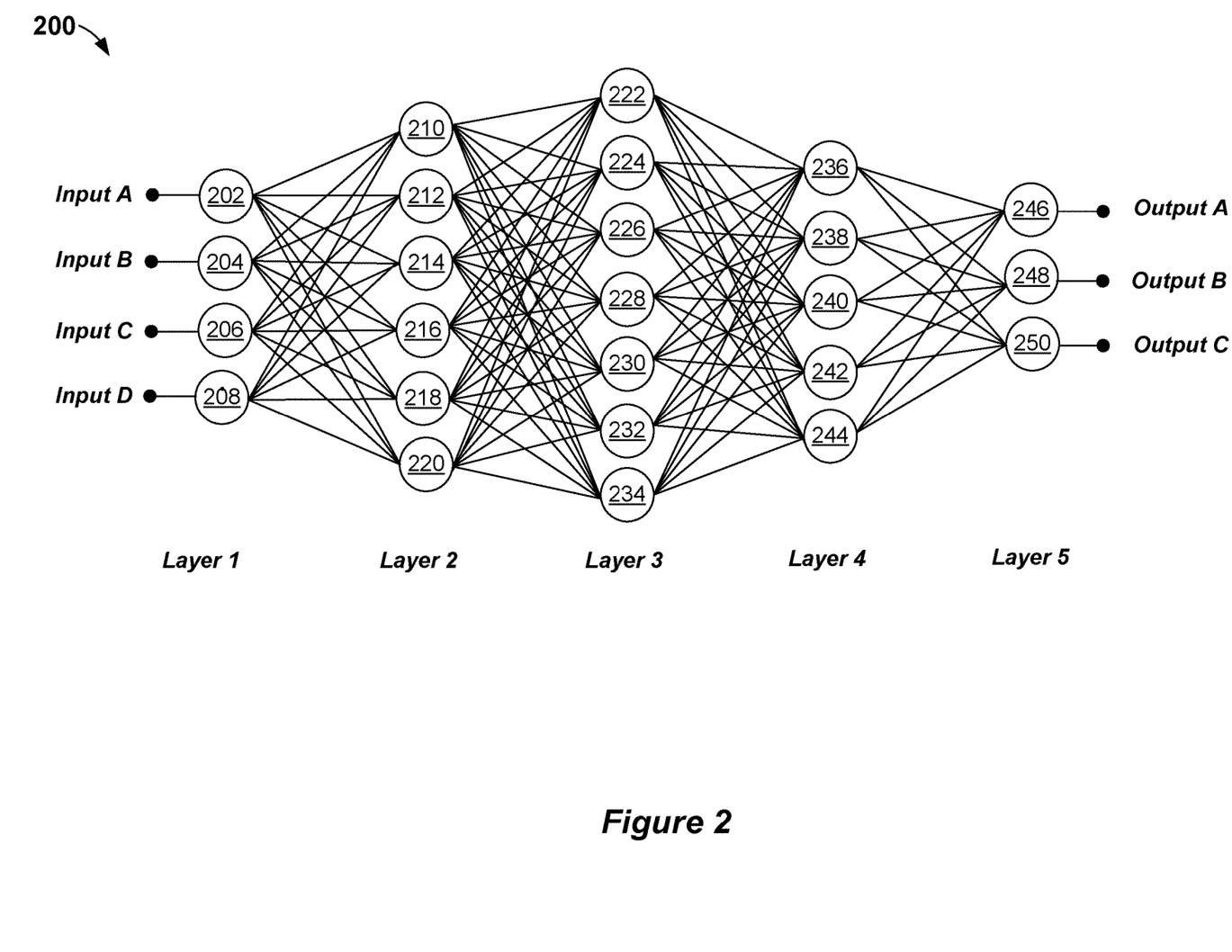
FIG. 2 is a neural network according to an embodiment.

Referring now to FIG. 2, a neural network 200 is depicted according to an embodiment. A neural network or model may have several layers and each layer may have a feature map. A feature map is a function which maps a data vector to feature space. Feature space relates to the neurons or activations in each layer. A data vector may be called an activation vector, a feature vector, or a vector. The activations in a model may be formed by a vector list. The vector list may be sorted by the strength of the activations, from a highest activation to a lowest activation. The neural network 200 is an example of a neural network, or a model. A neural network may have any number of layers and each layer may have any number of activations.

A feature vector is an array, or n-dimensional vector of numerical features that represent an object. The array is formed by the neurons or activations. Machine learning algorithms may require a numerical representation of objects, which may facilitate processing and statistical analysis. For example, the feature vector of an image may relate to pixels of an image. The feature vector of text may include occurrence frequency. Feature vectors may be combined with weights in order to construct a linear predictor function which may be used to determine a score for making a prediction. A feature space may be referred to as a vector space. Dimensionality reduction techniques can be used to reduce a dimensionality of the feature space.

Input to the model will be input to the first layer. Output of each layer is input to the next successive layer. The output of the last layer is the output of the model. The internal layers may be referred to as hidden layers, as the internal input and output of the internal layers are not accessible. Each layer has a number or a counter of activations, which corresponds to an amount of neurons.

The neural network 200 has 5 layers, shown as Layer 1, Layer 2, Layer 3, Layer 4, and Layer 5. The neural network 200 has four inputs, shown as Input A, Input B, Input C, and Input D, and three outputs, shown as Output A, Output B, and Output C. The four inputs are fed into the four activations of Layer 1, shown as 202, 204, 206 and 208. Input A is input into 202, Input B is input into 204, Input C is input into 206, and Input D is input into 208. The output of the four activations of Layer 1 are each input into each of the six activations of Layer 2, shown as 210, 212, 214, 216, 218, and 220. For example, the output of 202 is fed as an input into 210, 212, 214, 216, 218 and 220, while 210 receives as input the output of 202, 204, 206, and 208. The outputs of the six activations of Layer 2 are each input into the each of seven activations of Layer 3, shown as 222, 224, 226, 228, 230, 232, and 234. The outputs of the seven activations of Layer 3 are each input into each of the five activations of Layer 4, shown as 236, 238, 240, 242, and 244. The outputs of the five activations of Layer 4 are each input into each of the three activations of Layer 5, shown as 246, 248, and 250. The outputs of the three activations of Layer 5 are each an Output. The output of activation 246 is Output A, the output of activation 248 is Output B, and the output of activation 250 is Output C. The total number of activations in this embodiment is twenty five, spread over 5 layers. Each activation may also be referred to as a neuron.

Figure 3:
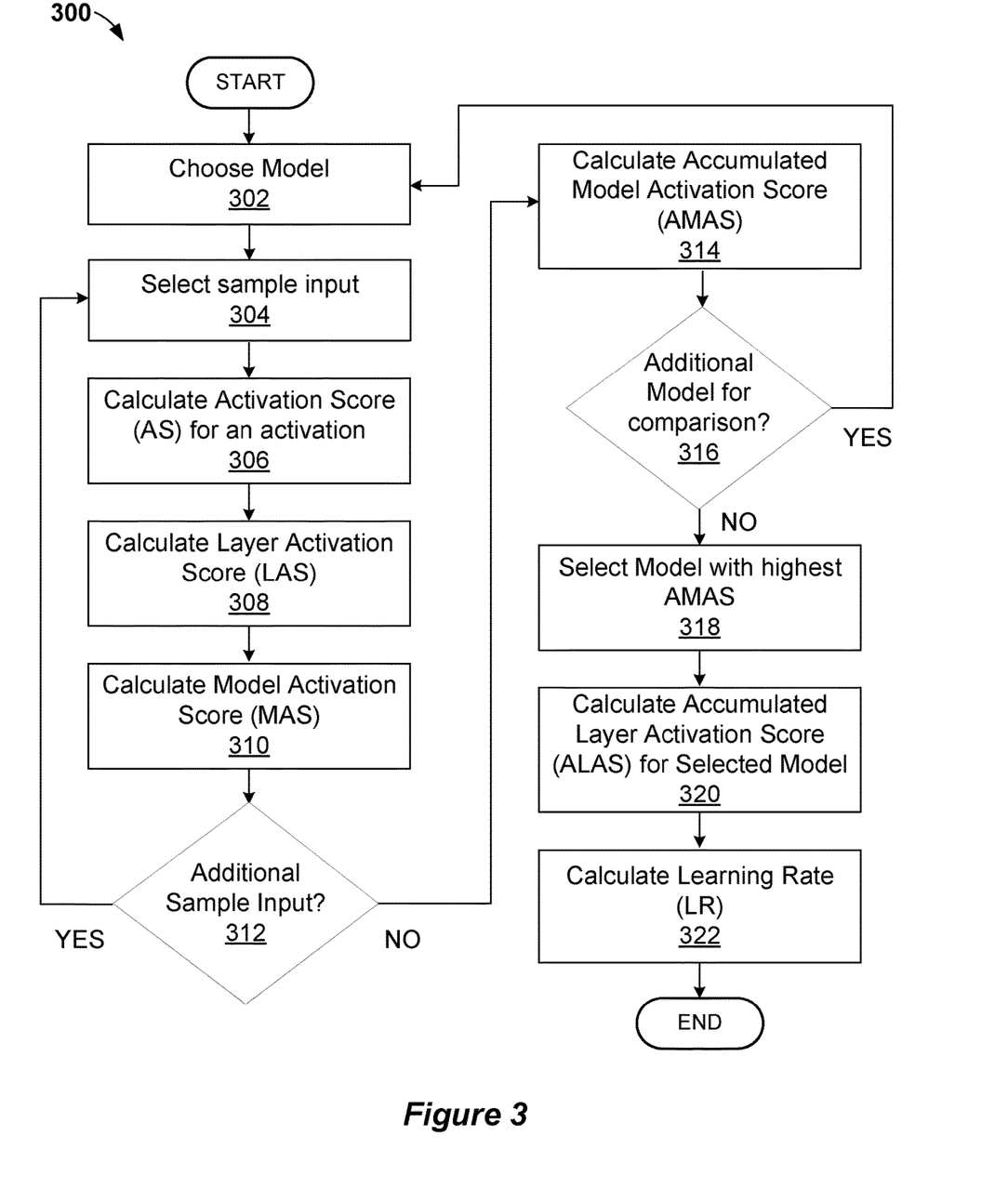
FIG. 3 is an operational flowchart illustrating a neural network model selection process according to an embodiment.

Referring now to FIG. 3, an operational flowchart illustrating a neural network model selection process 300 is depicted according to an embodiment.

At 302, the model matching program 110A, 110B chooses a model from a set of existing trained models, (hereinafter "set of models") which will be considered for use in creating a new model with a new dataset. The existing trained models have been trained on a large dataset and may be used as a base model for training with the new dataset. The existing trained models each have existing algorithms and parameters. The existing trained models will be evaluated and compared to each other with a subset of the new dataset, in order to determine a best model to use with the new data or new dataset.

Examples of an existing trained model, or an existing model, include AlexNet, Goggle® GoogLeNet (Google is a registered trademark of Goggle Inc), VGGNet. Examples of an existing model may be a model trained with a particular category of knowledge, for example, a model may identify a car, a model may classify a dog breed, a language translation model, or a medical diagnosis model, etc.

Next at 304, a sample input from the subset of the new dataset, is selected, in an embodiment. The sample input may be input into the chosen model, and an activation may be measured through each of the activations, or neurons, of the network, which will indicate a level of excitement. The subset of the new dataset, for example, may be 100 inputs. One of the 100 inputs may be selected, and may be repeated for each of the 100 inputs. The sample input may be selected randomly from the new dataset, and may be a predefined percentage of the new dataset, for example 20% of the data. The sample input may be the entire new dataset if the amount of computations for this analysis of the model matching program 110A, 110B is acceptable. In an embodiment, for a large dataset, the sample input may be a small percentage of the new dataset. Alternatively, for a small dataset, the sample input may be a relatively larger one, or even the whole dataset to make sure the metrics calculated in the following formulas have statistical property, and do not represent only a special case applicable to the small data size.

At 306, an Activation Score (hereinafter "AS") is calculated for an activation of a sample input from the subset of the new dataset into the selected model. The selected model may have the following variables:

L=number of layers
$M_l$=number of activations in layer l, where $1 \leq l \leq L$
i=an activation In the embodiment of the model for FIG. 2, for the neural network 200, there are 5 layers, L=5, layer 1 has 4 activations, layer 2 has 6 activations, layer 3 has 7 activations, layer 4 has 5 activations, and layer 5 has 3 activations as illustrated in the Table 1 below:

TABLE 1

| | l= | | | | |
|---|---|---|---|---|---|
| | 1 | 2 | 3 | 4 | 5 |
| $M_l$= | 4 | 6 | 7 | 5 | 3 |

An activation score, for an activation i, may be calculated for each activation, for a single input of data from the subset of the new dataset. The model in the example of FIG. 2 has a total of 25 activations over 5 layers. An activation score may indicate a strength of an activation, or an extent of excitement when for a dataset. A higher activation score may indicate that the activation is strong. The more activations with a high strength may indicate the model is a better match. One layer may be referred to as a feature map. The activation score for the activation i, in a layer l may be calculated with the formula:

$$a_{l,i} = \frac{\max(x_{l,i}, 0)}{\operatorname{mean}(\max(X_l, 0))}$$

Where:
$X_l$=a sorted activation vector of the feature map of layer l;
$x_{l,i}$=the value of the ith activation of layer l, which can be calculated by forwarding the input sample in the chosen model, where $(1 \leq i \leq M)$ In the equation above, the numerator is the maximum value of the $x_{l,i}$ values in the layer l, or the value 0, whichever is greater. The denominator is an average value of the activations in layer l which are positively activated.

Below in Table 2 is an example of $x_{1,i}$ values for the first layer or the first feature map of the neural network 200.

TABLE 2

| $x_{1,1} = 4$ | $x_{1,2} = 6$ | $x_{1,3} = 7$ | $x_{1,4} = -1$ |
|---|---|---|---|

In this example, $\max(x_{1,1}, 0)=4$; $\max(x_{1,2}, 0)=6$; $\max(x_{1,3}, 0)=7$; $\max(x_{1,4}, 0)=0$; and $\text{mean}(\max(X_1, 0))=\text{mean}(4,6,7,0)=4.25$.

Resulting in table 3 below activation scores for the activations of level 1.

TABLE 3

| | |
|---|---|
| $a_{1,1} = \dfrac{4}{4.25} = 0.94$ | $a_{1,2} = \dfrac{6}{4.25} = 1.41$ |
| $a_{1,3} = \dfrac{7}{4.25} = 1.64$ | $a_{1,4} = \dfrac{0}{4.25} = 0$ |

Similar calculations can be done for each of the layers. In the example of the neural network 200, there are 4 additional layers, layers 2 to 5.

Next, at 308, the model matching program 110A, 110B calculates a Layer Activation Score (hereinafter "LAS") for a single input of data from the subset of the new dataset in the selected model, for a selected layer, in an embodiment. The Layer Activation Score may select an N number of the largest activation scores sum to present a score of this layer, where:

$N \leq M$

The LAS is shown as follows, with the value of i increasing from 1 to N. This may be performed after ranking the AS values of the layer from highest to lowest, and then summing up the first N values.

$$\overline{a}_l = \sum_{i=1}^{N} a_{l,i}$$

Continuing with the example above, we may select N=2, then LAS for layer 1 may be calculated as:

$\overline{a}_1 = a_{1,3} + a_{1,2} = 1.64 + 1.41 = 3.05$

In an embodiment, the same N value may be used for each layer of the selected model, and the same N value may be used for each selected model to be used for comparison. In an alternate embodiment, N=p*M, where p is a constant percentage value and M is the total number of activations in a layer. For example, p=5%.

At 310, the model matching program 110A, 110B calculates a Model Activation Score (hereinafter "MAS"), for the selected model, in an embodiment. The MAS is a sum of a last several LAS scores for the last several layers of the selected model. There may be K layers used for the MAS. Following is an equation for the MAS:

$$a = \sum_{l=L-K+1}^{L} \overline{a}_l$$

Continuing with the example above, for the neural network 200, L=5, and we may select K=3. Therefore, the value for the MAS would equal a sum of the LAS for layers 3, 4, and 5. The same K value may be used for each selected model to be used for comparison.

Next at 312, the model matching program 110A, 110B determines if there is an additional sample input to be evaluated in the chosen model from the subset of the new dataset, in an embodiment. If there is a remaining sample input to be evaluated, the model matching program 110A, 110B returns to 304 to select a sample input. If there is not a remaining sample input to be evaluated, the model matching program 110A, 110B continues to 314 to calculate an accumulated model activation score.

At 314, the model matching program 110A, 110B calculates an Accumulated Model Activation Score (hereinafter "AMAS") for the selected model, in an embodiment. The AMAS may be used as a number for comparison between selected models to determine a best model for the new dataset. The AMAS formula is shown below, where D is a number of samples of inputs used from the dataset. There may be an AS for each input, and an LAS for each input, and a MAS for each input. The calculations may be repeated for D number of samples of inputs data from the subset of the new dataset. The same number of D inputs may be inserted into each of the selected models in order to compare the selected models.

The calculation of AMAS, where a(t) is the MAS for each sample input of the dataset and where t is a sample input number, is shown as:

$$AMAS = \sum_{t=1}^{D} a(t)$$

Continuing with the example above, there may be 100 sample inputs extracted from the new dataset. There may be an MAS calculation for each of the 100 sample inputs. Therefore, the AMAS score is an accumulation or sum of the 100 MAS scores for each of the 100 sample inputs.

At 316, the model matching program 110A, 110B determines if there is an additional model to be evaluated for comparison for the new dataset, in an embodiment. If there is an additional model to be evaluated, the model matching program 110A, 110B may return to step 302 to choose a model for evaluation. If there is no additional models to be evaluated, the model matching program 110A, 110B may continue to step 314 to select a model with the highest AMAS.

At 318, the model matching program 110A, 110B selects the model with the highest AMAS, in an embodiment. The model matching criteria may be to select the model with the largest AMAS. The selected model may have the highest activations for the sample inputs from the new dataset and may be a best fit to be used for training with the new dataset.

At 320, the model matching program 110A, 110B will calculate an Accumulated Layer Activation Score (hereinafter "ALAS") for the selected model, in an embodiment. The ALAS for a layer l may be used in determining a base learning rate for a layer l. The ALAS for layer l may be a sum of the LAS values for each of the sample inputs when it went through layer l. The ALAS for a layer l may be calculated as:

$$ALAS_l = \sum_{t=1}^{D} \overline{a}_l(t)$$

At 322, the model matching program 110A, 110B calculates a Learning Rate (hereinafter "LR") for the layer l in the selected model, in an embodiment. The LR for the layer l multiplies a Base Learning Rate (hereinafter "BLR") with a function $f$ of the ALAS for the layer l. The BLR is predefined, and is hyper parameter in deep learning, and may be set by an administrator. In an embodiment, the BRS may be set to 0.01 or 0.001 in a fine-tuning stage. The function $f$ may be inversely proportional to the ALAS for the layer l. The LR for the layer l may be calculated as:

$$LR_l = BLR * f(ALAS_l)$$

Following are different embodiments of the function $f$.

$$f(x) = \frac{\infty}{x}$$

$$f(x) = \frac{a}{\log(x)}$$

Where a is a constant that may be determined by the selected model, or may be set by an administrator, and may change.

It may be appreciated that FIG. 3 provides only an illustration of one implementation and does not imply any limitations with regard to how different embodiments may be implemented. Many modifications to the depicted environments may be made based on design and implementation requirements.

Figure 4:
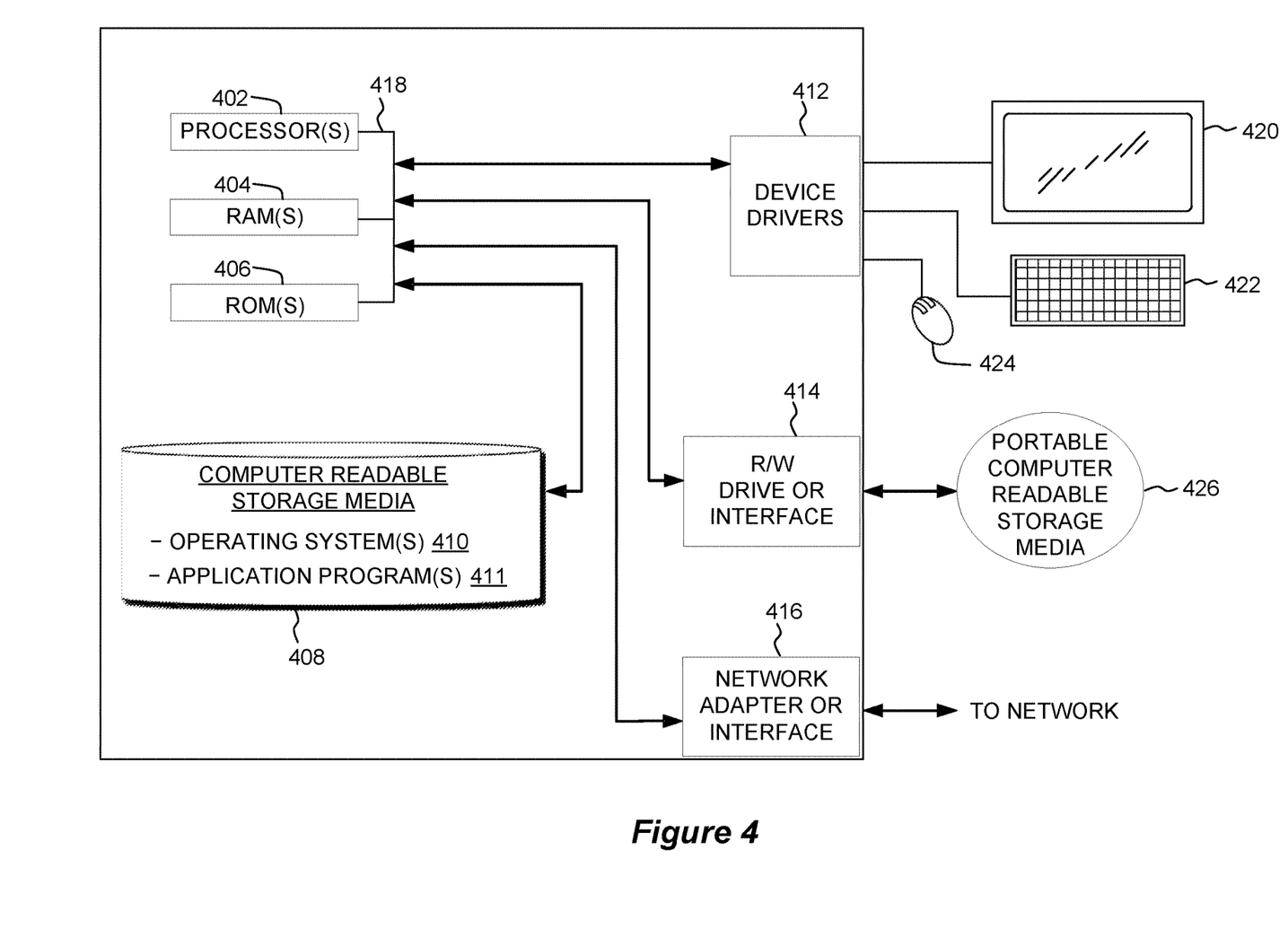
FIG. 4 is a block diagram of internal and external components of computers and servers depicted in FIG. 1 according to an embodiment.

Referring now to FIG. 4, a block diagram of components of a computing device, such as the client computing device 102 or the server 112, of the system 100 of FIG. 1, in accordance with an embodiment of the present invention is shown. It should be appreciated that FIG. 4 provides only an illustration of one implementation and does not imply any limitations with regard to the environments in which different embodiments may be implemented. Many modifications to the depicted environment may be made.

The computing device may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, the model matching program 110A, 110B, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device may also include a R/W drive or interface 414 to read from and write to one or more portable computer readable storage media 426. Application programs 411 on the computing device may be stored on one or more of the portable computer readable storage media 426, read via the respective R/W drive or interface 414 and loaded into the respective computer readable storage media 408.

The computing device may also include a network adapter or interface 416, such as a TCP/IP adapter card or wireless communication adapter (such as a 4G wireless communication adapter using OFDMA technology). Application programs 411 on the computing device may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

The computing device may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The present invention may be a system, a method, and/or a computer program product. The computer program product may include a computer readable storage medium (or media) having computer readable program instructions thereon for causing a processor to carry out aspects of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
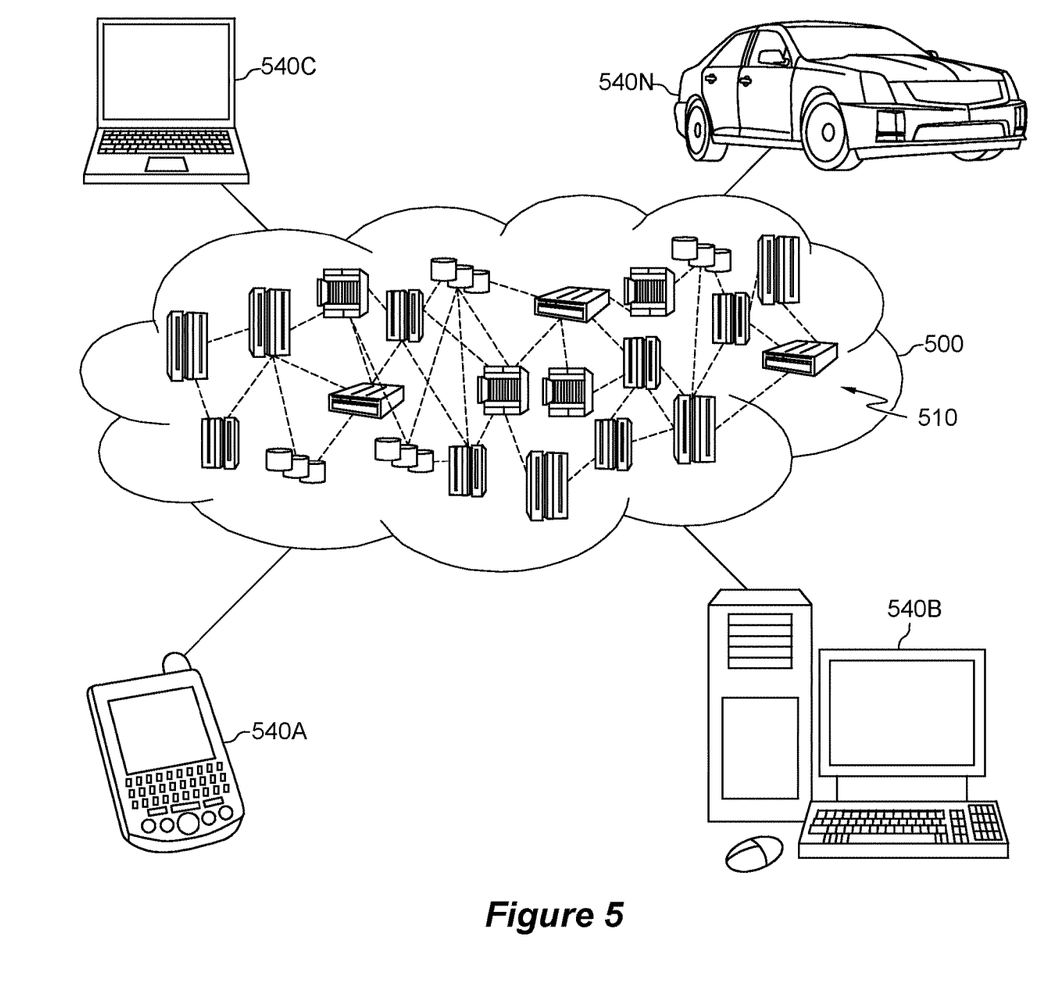
FIG. 5 depicts a cloud computing environment according to an embodiment of the present invention.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 540A, desktop computer 540B, laptop computer 540C, and/or automobile computer system 540N, may communicate. Cloud computing nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 540A-N shown in FIG. 5 are intended to be illustrative only and that cloud computing nodes 510 and cloud computing environment 500 can communicate with any type of computerized device over any type of network and/or network addressable connection (e.g., using a web browser).

Figure 6:
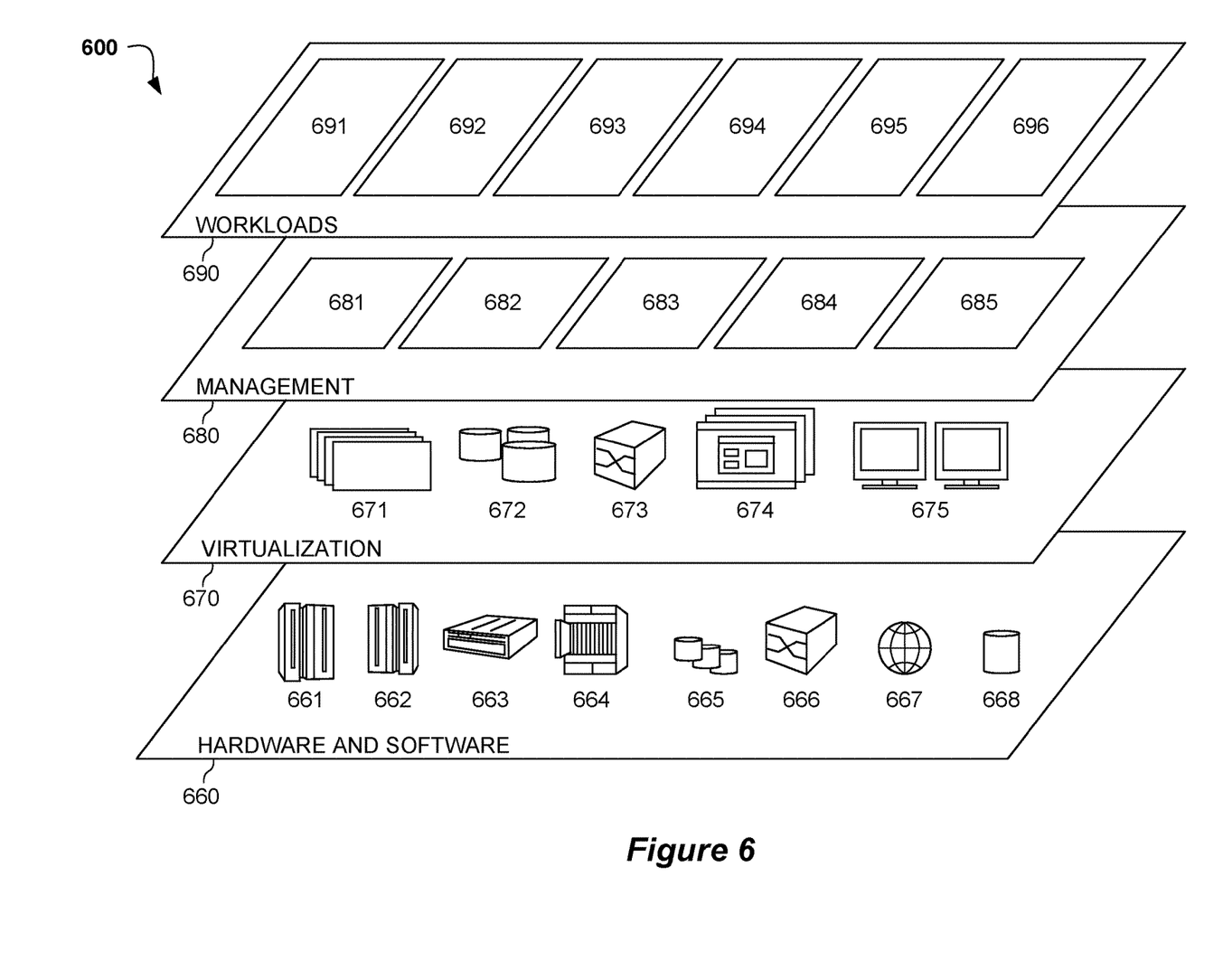
FIG. 6 depicts abstraction model layers according to an embodiment of the present invention.

Referring now to FIG. 6, a set of functional abstraction layers 600 provided by cloud computing environment 500 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and model matching and learning rate selection 696. Model matching and learning rate selection 696 may relate to analyzing new data on existing models to determine which of the existing models to train with the new data, and to determine a learning rate selection rate.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for model selection for training a new dataset, the method comprising:
choosing a model from a set of models to be evaluated for training the new dataset;
selecting a sample input from a subset of the new dataset;
calculating a model activation score for each of the sample inputs in the chosen model;
calculating an accumulated model activation score for the chosen model, depending on the model activation score of each of the sample inputs in the chosen model;
calculating an accumulated model activation score for each model from the set of models to be evaluated for training the new dataset;
selecting the model for training the new dataset with the highest accumulated model activation score;
calculating an accumulated layer activation score for each layer of a set of layers for the selected model, wherein the accumulated activation score for each layer is based on a summation of layer activation scores for each of the sample inputs through the corresponding layer;
calculating a learning rate for each layer of the set of layers, wherein the learning rate is inversely proportional to the corresponding accumulated layer activation score; and
training the selected model using the calculated learning rate for each layer of the set of layers.

2. The method according to claim 1, wherein calculating the model activation score for the each of the sample inputs in the chosen model further comprises:
calculating an activation score for the sample input in an activation in a layer of the set of layers of the chosen model;
calculating a set of layer activation scores for the sample input, dependent on a sum of the activation scores for each activation of the layer of the set of layers of the chosen model;
ranking the set of layer activation scores from highest to lowest; and
summing a subset of the set of layer activation scores.

3. The method according to claim 1, wherein the set of models is selected from a group consisting of: AlexNet, Goggle® GoogLeNet, and VGGNet.

4. The method according to claim 1, wherein the activation score is dependent on a corresponding activation divided by an average of maximum activations of each layer of the chosen model.

5. A processor-implemented method for model selection for training a new dataset, the method comprising:
choosing a model from a set of models to be evaluated for training the new dataset, wherein the set of models is selected from a group consisting of: AlexNet, Goggle® GoogLeNet, and VGGNet;
selecting a sample input from a subset of the new dataset;
calculating a model activation score for each of the sample inputs in the chosen model, wherein the model activation score is dependent on a corresponding activation divided by an average of maximum activations of each layer of the chosen model;
calculating an accumulated model activation score for the chosen model, depending on the model activation score of each of the sample inputs in the chosen model;
calculating an accumulated model activation score for each model from the set of models to be evaluated for training the new dataset; and
selecting the model for training the new dataset with the highest accumulated model activation score.

6. The method according to claim 5, wherein calculating the model activation score for the each of the sample inputs in the chosen model further comprises:
calculating an activation score for the sample input in an activation in a layer of a set of layers of the chosen model;
calculating a set of layer activation scores for the sample input, dependent on a sum of the activation scores for each activation of the layer of the set of layers of the chosen model;
ranking the set of layer activation scores from highest to lowest; and
summing a subset of the set of layer activation scores.

7. The method according to claim 5, further comprising:
calculating a learning rate for the selected model.

8. The method according to claim 7, wherein calculating a learning rate for the selected model further comprises:
calculating a set of learning rates corresponding to the set of layers of the selected model.

9. The method according to claim 8, wherein calculating a set of learning rates corresponding to the set of layers for the selected model further comprises:
calculating an accumulated layer activation score for each layer of the set of layers for the selected model; and
calculating a learning rate for each layer of the set of layers, wherein the learning rate is inversely proportional to the corresponding accumulated layer activation score.

10. A processor-implemented method for model selection for training a new dataset, the method comprising:
choosing a model from a set of models to be evaluated for training the new dataset;
selecting a sample input from a subset of the new dataset;
calculating a model activation score for each of the sample inputs in the chosen model, wherein the activation score is dependent on a corresponding activation divided by an average of maximum activations of each layer of the chosen model;
calculating an accumulated model activation score for the chosen model, depending on the model activation score of each of the sample inputs in the chosen model;
calculating an accumulated model activation score for each model from the set of models to be evaluated for training the new dataset; and
selecting the model for training the new dataset with the highest accumulated model activation score.

11. The method according to claim 10, wherein calculating the model activation score for the each of the sample inputs in the chosen model further comprises:
calculating an activation score for the sample input in an activation in a layer of a set of layers of the chosen model;

calculating a set of layer activation scores for the sample input, dependent on a sum of the activation scores for each activation of the layer of the set of layers of the chosen model;

ranking the set of layer activation scores from highest to lowest; and summing a subset of the set of layer activation scores.

12. The method according to claim 10, further comprising:

calculating a learning rate for the selected model.

13. The method according to claim 12, wherein calculating a learning rate for the selected model further comprises:

calculating a set of learning rates corresponding to the set of layers of the selected model.

14. The method according to claim 13, wherein calculating a set of learning rates corresponding to the set of layers for the selected model further comprises:

calculating an accumulated layer activation score for each layer of the set of layers for the selected model; and calculating a learning rate for each layer of the set of layers, wherein the learning rate is inversely proportional to the corresponding accumulated layer activation score.

15. The method according to claim 10, wherein the set of models is selected from a group consisting of: AlexNet, Goggle® GoogLeNet, and VGGNet.

* * * * *